US005539962A

United States Patent [19]
Lee

[11] Patent Number: 5,539,962
[45] Date of Patent: Jul. 30, 1996

[54] CLIP FOR COUPLING AN INNER SHIELD WITH A FRAME

[75] Inventor: Do-Heum Lee, Busan-si, Rep. of Korea

[73] Assignee: Samsung Display Devices Co., Ltd., Kyunggi-do, Rep. of Korea

[21] Appl. No.: 514,455

[22] Filed: Aug. 11, 1995

[30] Foreign Application Priority Data

Oct. 25, 1994 [KR] Rep. of Korea .................. 94-27888

[51] Int. Cl.$^6$ ........................................... A44B 17/00
[52] U.S. Cl. .................. 24/453; 24/293; 24/297; 24/573.2; 411/508; 411/913
[58] Field of Search .................. 24/453, 41.1, 339, 24/573.1, 573.2, 293, 294, 295, 297; 411/508, 510, 913

[56] References Cited

U.S. PATENT DOCUMENTS

| | | | |
|---|---|---|---|
| 2,692,414 | 10/1954 | Poupitch | 24/293 |
| 3,024,509 | 3/1962 | Hamann | 24/453 |
| 3,864,789 | 2/1975 | Leitner | 24/293 |
| 4,438,552 | 3/1984 | Omata | 24/573.2 |

*Primary Examiner*—Victor N. Sakran
*Attorney, Agent, or Firm*—Christie, Parker & Hale, LLP

[57] ABSTRACT

A clip for coupling an inner shield with a frame of a cathode ray tube preventing the clip from being detached from an insertion hole after coupling and easy to mount, comprising: a head portion including grippers 91 having free ends, extended from the two sides of the head portion with having a certain angle; connecting portions formed by upwardly bending extensions from the two sides of the head portion; and supporting portions having elastic bending portions formed by outwardly bending extensions from the upper part of the connecting portions and contacting portions formed by upwardly bending extensions from the elastic bending portions.

2 Claims, 3 Drawing Sheets

CLIP FOR COUPLING AN INNER SHIELD WITH A FRAME

BACKGROUND OF THE INVENTION

1. Field of the Invention

The present invention relates to a clip for coupling an inner shield with a frame. More particularly, it relates to a clip for coupling an inner shield with a frame, which is easy to couple but not removed easily.

2. Description of the Prior Art

A panel of a cathode ray tube is provided with a frame for supporting a shadow mask, and the frame is for attaching not only the shadow mask but also an inner shield for shielding the influence of the geomagnetic field.

It is impossible to form the frame and the inner shield integrally due to their structural natures, and therefore, they are separately manufactured, the coupling of them being performed in the assembling process.

FIG. 3 is a perspective view showing a conventional clip for coupling the inner shield with the frame. As shown in FIG. 3, the clip C is constituted such that a metal strap forms a V shape by being bent at a position approximately middle of the metal strap thereby forming a first elastic bending portion 1, and comprises: a pair of first bending portions 2 which are formed by inwardly bending the extensions of the first elastic bending portion 1 at positions a certain distance from the first elastic bending portion 1; a pair of second bending portions 3 which are formed by outwardly bending the extensions of the first bending portions 1 at positions a certain distance from the corners of the first bending portions 1 thereby forming a pair of shoulders 4; a pair of second elastic bending portions 5 which are formed by outwardly bending again the extensions of the second bending portions 3 at positions a certain distance from the corners of the second bending portions 3; and a pair of grasping portions 6 which are formed by folding extensions of the second elastic bending portions 5 and completely attaching the same to the extensions of the second bending portions 3 in order to remove its own elasticity from the second elastic bending portions 5; and a pair of third elastic bending portions 7 and a pair of pressing portions 8 which are integrally formed by outwardly bending end portions of the grasping portions 6.

The shoulders 4 are endowed with elasticity of the first elastic bending portions 1 and the pressing portions 8 are endowed with elasticity of the second bending portions 3 and the third elastic bending portions 7.

Therefore, as shown in FIG. 4, when the clip C is inserted into an insertion hole H formed on the inner shield I and the frame F, the shoulders 4 give force, in horizontal direction, to the lower face of the frame F using the elasticity endowed from the first elastic bending portions 1.

In addition, the pressing portions 8 formed on the end of the grasping portions 6 are contacted on the upper face of the inner shield I, and therefore, give force, in vertical direction, to the upper face of the inner shield by the second bending portions 3 and the third elastic bending portions 7.

The clip C couples the inner shield I with the frame F by keeping such status that the shoulders 4 are caught by the lower face of the frame F and the pressing portions 8 press the upper face of the inner shield I.

The conventional clip can be mounted by inwardly pressing the grasping portions 6 and inserting the first elastic bending portion 1 of the clip C into the insertion hole H.

However, there is a problem that the clip C may be detached from the insertion hole H after coupling because the elasticity acting between the shoulders 4 and the pressing portions 8 is insufficient unless distances between the shoulders 4 and the pressing portions 8 are uniformly formed when the clip is manufactured.

In addition, the clip C is inconvenient to use because the grasping portions 6 must be respectively grasped and pressed by user's fingers when combining the inner shield and the frame with the clip.

SUMMARY OF THE INVENTION

Therefore, it is an object of the present invention to provide a clip for coupling the inner shield and the frame which is easy to couple but not detached from the insertion hole easily.

To accomplish this and other objects, the present invention provides a clip for coupling a frame mounted inside of a panel of a cathode ray tube and a inner shield mounted on the frame comprising:

a head portion including grippers having free ends, extended from the two sides of the head portion with having a certain angle;

connecting portions formed by upwardly bending extensions from the two sides of the head portion; and supporting portions having elastic bending portions formed by outwardly bending extensions from the upper part of the connecting portions and contacting portions formed by upwardly bending extensions from the elastic bending portions.

The head portion can be formed in its section to be in a V shape for easy insertion when the clip is inserted into the insertion hole.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENT

Figure 1:
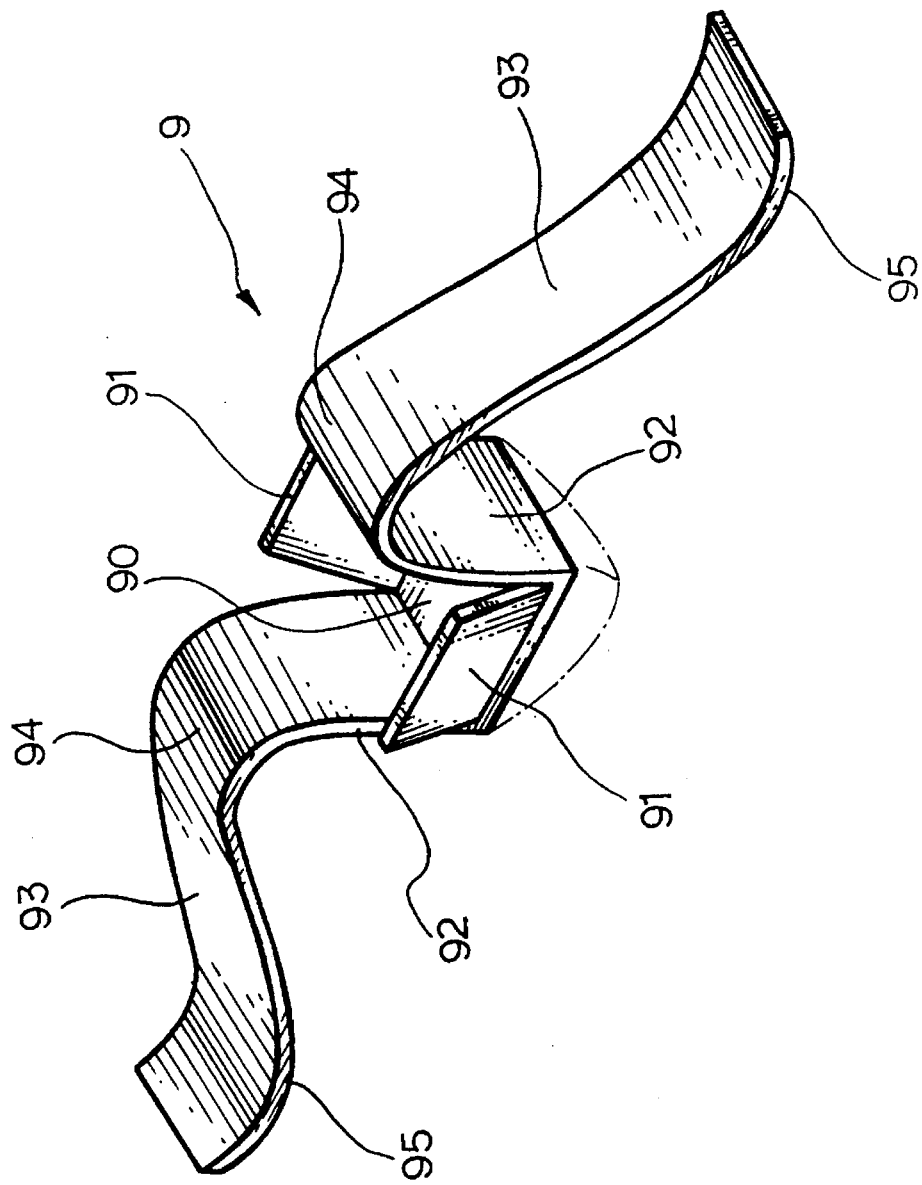
FIG. 1 is a perspective view showing a clip according to a preferred embodiment of the present invention.

In FIG. 1, the reference number 9 indicates an entire clip. The clip 9 includes a head portion 90 formed by upwardly bending a metal strap having a certain width at a middle portion thereof.

Grippers 91 having free ends are formed by upwardly bending extensions from two opposite sides of the head portion 90, and the grippers 91 are able to elastically move toward a center of the head portion 90.

Connecting portions 92 are formed by upwardly bending extensions from the other two opposite sides of the head portion 90. The connecting portions 92 are higher than the grippers 91.

Supporting portions 93 for supporting an inner shield which is not shown are extended from upper ends of the connecting portions 92, and, as shown in FIG. 1, the supporting portions 93 has elastic bending portions 94 formed by outwardly bending extensions from the upper ends of the connecting portions 92 and contacting portions 95 formed by upwardly bending extensions from the elastic bending portions 94.

The following description is about a method of coupling the clip 9.

Figure 2:
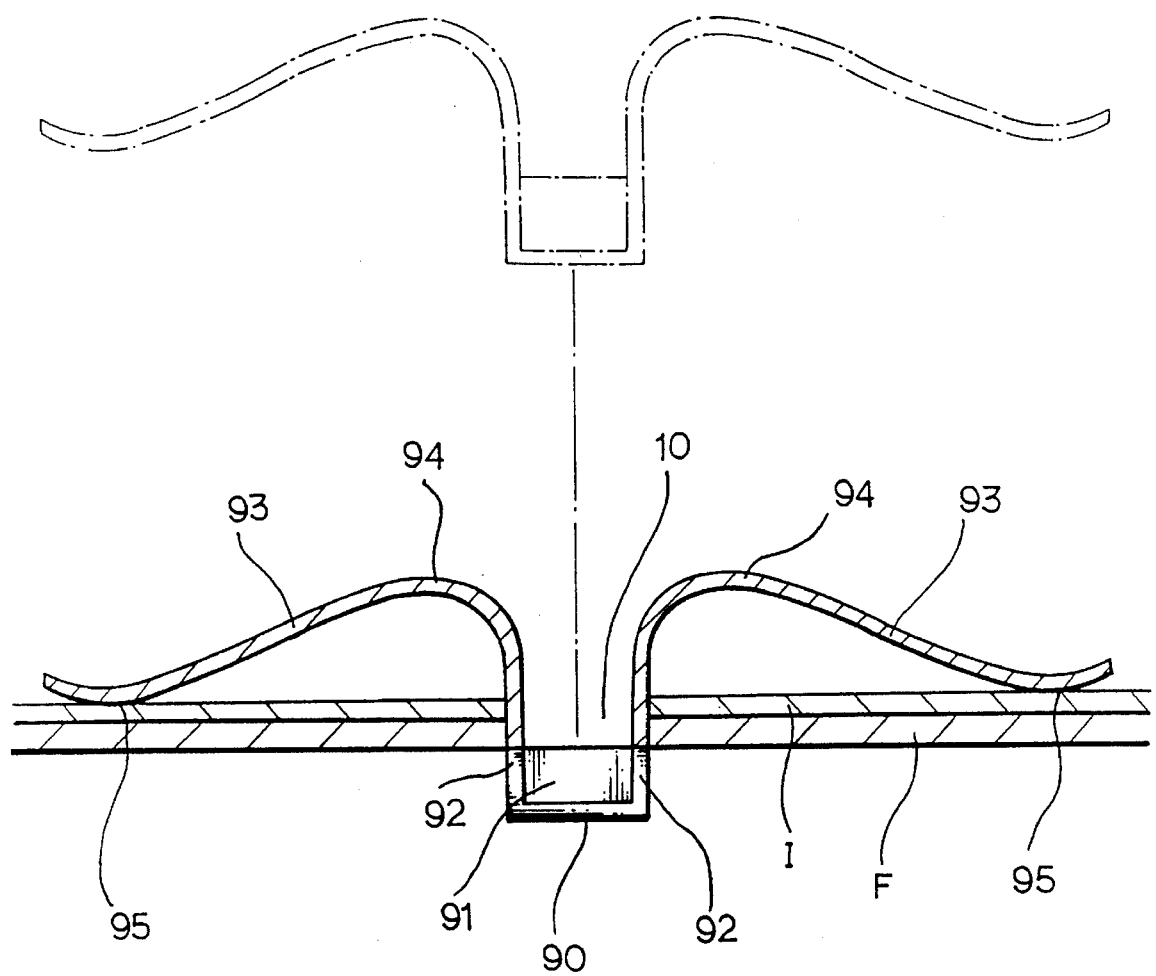
FIG. 2 is a sectional view showing a coupling status of the clop of FIG. 1.
Figure 3:
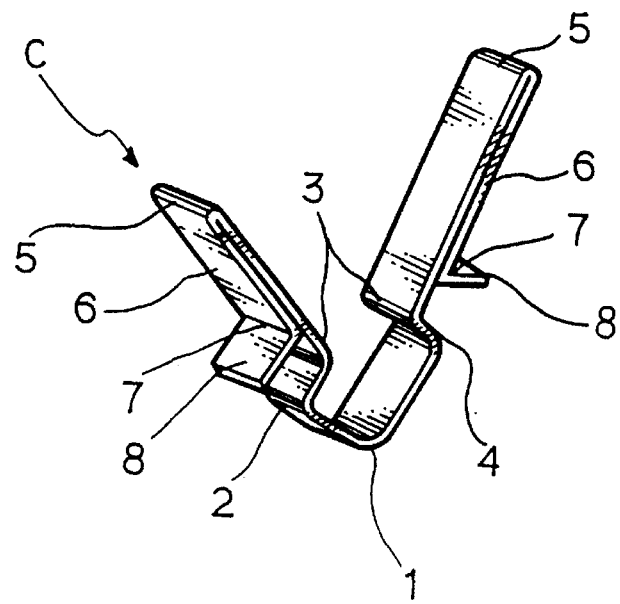
FIG. 3 is a perspective view showing a conventional clip.
Figure 4:
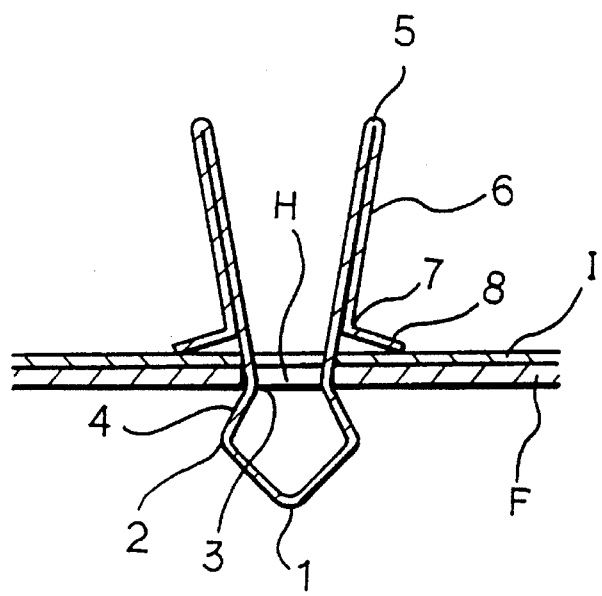
FIG. 4 is a sectional view showing a coupling status of the clip of FIG. 3.

As shown in FIG. 2, the inner shield I and the frame F have corresponding insertion holes 10. When the inner shield I and the frame F are superposed, the clip 9 is inserted into the insertion holes 10.

When inserting the clip, the head portion 90 of the clip 9 is inserted from the upside of the insertion holes 10.

The grippers 91 are elastically moved toward the center of the insertion hole 10 as the clip 9 passes through the insertion holes 10 and restored to original status by their own elasticity, and the upper ends of the grippers 91 abut on the lower face of the frame F and support the frame F once the clip 9 is completely inserted.

The contacting portions 95 are contacted on the upper face of the inner shield I and strongly support the inner shield I because the contacting portions 95 are endowed the elasticity from the elastic bending portions 94.

According to the present invention, the frame F and the inner shield I are safely combined each other because the grippers 91 abut on and support the frame F on the lower face of the frame F, and the contacting portions 95 are contacted on and support the inner shield I on the upper face of the inner shield I.

In the embodiment shown, the head portion 90 is formed in rectangular shape, however, it is easy to insert the head portion 90 into the insertion holes 10 if the head portion 90 is formed in generally round shape to have a V shape in cross section of the clip as illustrated with a chained line in FIG. 1.

The clip for coupling the inner shield with the frame according to the present invention has an advantage that the coupling is easily performed if only the head portion of the clip is simply inserted into the insertion hole.

Although only a preferred embodiment and selective modifications of the invention have been disclosed and described, it is apparent that other embodiments and modifications of the invention are possible within the scope of the appended claims.

What is claimed is:

1. A clip for coupling a frame mounted inside of a panel of a cathode ray tube and a inner shield mounted on the frame comprising:

a head portion having four sides;

a pair of grippers having free ends, the grippers being extended from too opposite sides of the head portion;

a pair of connecting portions formed by upwardly bending extensions from remaining two opposite sides of the head portion; and a pair of supporting portions having elastic bending portions formed by outwardly bending extensions from upper ends of the connecting portions and contacting portions formed by upwardly bending extensions from the elastic bending portions.

2. The clip according to claim 1, wherein the head portion is formed in its section in a V shape.

\* \* \* \* \*

UNITED STATES PATENT AND TRADEMARK OFFICE
CERTIFICATE OF CORRECTION

PATENT NO.   :   5,539,962
DATED        :   July 30, 1996
INVENTOR(S) :   Do-Heum Lee It is certified that error appears in the above-indentified patent and that said Letters Patent is hereby corrected as shown below:

Column 2, line 21, before "inner" change "a" to -- an --.
Column 2, line 24, after "portion" delete "with".
Column 2, line 46, change "clop" to -- clip --.
Column 3, line 4, before "elastic" change "has" to -- have --.
Column 3, line 26, after "endowed" replace "the" with -- with --.
Column 3, line 29, after "combined" insert -- with --.
Column 4, line 17, before "inner" change "a" to -- an --.
Column 4, line 22, change "too" to -- two --.
Column 4, line 25, before "remaining" insert -- the --.

Signed and Sealed this

Twenty-second Day of July, 1997

Attest:

BRUCE LEHMAN

Attesting Officer

Commissioner of Patents and Trademarks